United States Patent [19]
Tomory

[11] Patent Number: 5,815,764
[45] Date of Patent: Sep. 29, 1998

[54] DOCUMENT JOB ROUTING SYSTEM FOR A PRINTING SYSTEM

[75] Inventor: Ronald S. Tomory, Webster, N.Y.

[73] Assignee: Xerox Corporation, Stamford, Conn.

[21] Appl. No.: 721,513

[22] Filed: Sep. 26, 1996

[51] Int. Cl.⁶ .......................... G03G 15/00; G03G 21/00
[52] U.S. Cl. ................................ 399/1; 399/403
[58] Field of Search ................... 399/1, 81, 361, 399/403, 405

[56] References Cited

U.S. PATENT DOCUMENTS

| | | | |
|---|---|---|---|
| 4,414,579 | 11/1983 | Dattilo et al. | 399/1 X |
| 5,270,773 | 12/1993 | Sklut et al. | 399/20 |
| 5,308,058 | 5/1994 | Mandel et al. | 271/297 |
| 5,328,169 | 7/1994 | Mandel | 271/290 |
| 5,342,034 | 8/1994 | Mandel et al. | 270/53 |
| 5,358,238 | 10/1994 | Mandel et al. | 271/298 |
| 5,435,544 | 7/1995 | Mandel et al. | 271/298 |
| 5,525,031 | 6/1996 | Fox | 399/404 X |
| 5,535,009 | 7/1996 | Hansen | 399/361 X |
| 5,547,178 | 8/1996 | Costello | 270/52.02 |
| 5,551,686 | 9/1996 | Sanchez et al. | 271/298 |
| 5,603,492 | 2/1997 | Mandel et al. | 270/58.09 |
| 5,610,724 | 3/1997 | Kaneko et al. | 399/18 X |

Primary Examiner—Fred L. Braun
Attorney, Agent, or Firm—Gary B. Cohen

[57] ABSTRACT

A system for routing a document job in a printing system with a print engine. The routing system includes a controller providing a set of information including an indication to a user of the printing system that the print engine is busy producing a first set of prints from a first set of image data. The set of information is received at a user interface and the user, in response to receiving the set of information, directs the controller, by way of the user interface, to cause a second set of prints, representative of a second set of image data developed at the printing system while the first set of prints is being produced by the print engine, to be (i) produced subsequent to the producing of the first set of prints and (ii) delivered to one of one or more mailbox bins.

9 Claims, 9 Drawing Sheets

DOCUMENT JOB ROUTING SYSTEM FOR A PRINTING SYSTEM

Cross Reference to U.S. patent application Ser. Nos. 08/876,916 and 08/721,520

The Present Application is related in subject matter to and cross-referenced with both U.S. patent application Ser. No. 08/876,916 (entitled Sheet Delivery Control System) and U.S. patent application Ser. No. 08/721,520 (entitled Control System For Mailboxing Arrangement).

BACKGROUND OF THE INVENTION

This invention relates generally to a document job routing system for a printing system and, more particularly to a routing system that permits a user at an image capture device to develop a copy job and send it to his/her mailbox bin or a remote network destination while another document job is in the process of being printed.

The problem of keeping shared (networked) printer job outputs from becoming mixed up, or accidentally removed by others, especially where commonly stacked, even if the jobs are initially offset, is serious enough that some users have for several years placed manual mailboxes, like Post Office boxes, adjacent the printer, with the boxes labeled with different user names, for manual job sorting. Likewise, for shared facsimile machines.

The following additional partial broad definitions may be helpful to the discussions herein: "Mailbox[ing]": temporarily (or semi-permanently) assigning a unique predetermined electronic address to designated ones of plural bins of a sorter-like output device and enabling a user's output to be directed into a selected bin so assigned. It may or may not include locked bins. Preferably, the user's mailbox output is plural, pre-collated, jobs with all sheets going to a single bin, not requiring sorting. "Sorting": conventionally, this refers to sending one copy sheet of each original page into one bin of a sorter, the next copy sheet into the next bin, etc., repeated for the number of copies, until each of the plural bins required has one copy, then stacking one copy sheet of the next original in each said bin, etc, to compile one collate set in each bin. Thus, job or addressee "mailboxing" is not "sorting" in the common or usual sense of a collating plural identical copy sheets by sequentially placing each sheet in a different bin, and repeating those steps. However, similar "sorter" hardware may be employed in part if it can provide rapid random bin access and other desired features. "Stacking": providing the ability to arrange sets of sheets (which may be stapled or otherwise finished sets of sheets), into a well controlled, generally vertical, common stack, although partial "offsetting" of separate job sets may be desirable.

The term "mailboxing" as used herein refers to handling or sorting physical, i.e., "hard copy" printed sheets. It does not refer to electronic documents or images, which are much easier to manipulate.

To express it in another way, a "mailbox" in the example herein takes multiple print jobs from a printer (from user terminals, fax, networked purge images, scanned document jobs, or the like or combinations thereof) and separates jobs by users and stacks these hardcopy outputted print jobs into individual bins for individual users, by users. [As an additional software option, users may also send print jobs to other users' mailbox bins if desired.] Mailbox bins can, in general, be either user assignable, or automatically assigned by the printer, print server, or mailbox unit. Optionally, jobs can be individually stapled if a stapler unit is provided. Optional security doors can be added to any or all bins if desired. An overflow bin or general, shared, stacking tray may also desirably be provided, not assigned to any one user.

"Mailboxing" may more specifically, as in the example herein, refer to temporarily or permanently assigning a unique and predetermined electronic address to respective ones of plural bins of sorter-like equipment for a copier, printer or facsimile machine output, and enabling a particular user's output of one or more jobs to be directed into one or more selected bins so assigned. It may or may not include means for locking the bins and unlocking access thereto, as indicated above and as in the example herein. It may or may not additionally include a bin assignment scheme wherein each bin has an associated LCD or other type of display with the appropriate user name or label displayed, and/or a common or central display, as in the example herein, and/or wherein jobs are placed in more than one available bin if needed, i.e., if the sheet stacking capacity of one assigned bin is exceeded. As noted, a mailbox for a laser or other electronic page input printer may desirably print and feed plural precollated sets of sheets into a selected bin, rather than functioning as a normal collator or sorter, [although it may do so additionally or alternatively] since an electronic page printer can normally easily electronically reorder and recirculate the "original" pages being copied to "copy" and output them in precollated or serial page job set order, rather than making plural directly sequential copies of each page requiring post-collation and separate bins for each copy set in a sorter or collator.

A very desirable mailbox system feature is a "variable bin assignment" system in which many users can share one mailbox unit with only a limited number of bins by variable (dynamic) bin assignments and their electronic logging or tracking, with the bin assignment(s) for a particular user or group of users, depending on bin availability (the bins empty at any given time) rather then a fixed, permanent assignment of certain bins to certain users or customers. This greatly increases the effective capacity or the number of potential shared users.

Another very desirable and related "mailbox" feature is a "virtual bin" concept, in which the software in a programmed computer or controller controlling the mailbox sheet distributor puts the first job output of user A into an assigned bin X which is determined to be available. Then, if a subsequent job for user A will also fit into bin X, it is also put into bin X. If not, then the subsequent job for user A is automatically put into an assigned "overflow" bin Y, etc. I.e., for each user, the number of assigned bins is automatically increased to meet the users need. Preferably, adjacent bins are used for the job overflow. Art noted re bin overflow features in general includes Xerox Corporation U.S. Pat. No. 3,871,643 issued Mar. 18, 1975 to W. Kukucka and T. Acquaviva; IBM U.S. Pat. No. 4,522,486 to Clark et al. (using the term "virtual bin"); and U.S. Pat. No. 4,134,581 to Johnson, et al.

Another desirable feature is a bin assignment display system wherein the mailbox unit has a central (or bin-associated) LCD or other such bin-identifying operator display, and wherein user's jobs are placed in one, or (if needed) multiple, available bins, with all the appropriate bin(s) identified and displayed for the user name or other identifier, which may also be displayed. [See, e.g., U.S. Pat. Nos. 4,501,419 and 4,437,660, further discussed herein].

The present system is desirably usable for electronic mail hardcopy prints and/or other networked or shared user document prints in general. E.g., in a shared user, networked, printer environment, such as in a modern office environment, the printer can electronically recognize the sender or user terminal sending the printing job from network or document electronic information already available in said job. (Such shared printers may also have alternate scanner or floppy disk document inputs.)

It is additionally noted that combined facsimile and/or digital scanning, copying and printing (and even conventional light lens or digital copying) can be provided in one single unit, encompassed by the term "printer" as used herein. Note, e.g., Xerox Corporation U.S. Pat. No. 4,947,345 filed Jul. 25, 1989 and issued Aug. 7, 1990 to Paradise, et al.; U.S. Pat. No. 3,597,071, filed Aug. 30, 1968 and issued Jul. 27, 1971 to Jones; Fuji Xerox Co. Ltd. U.S. Pat. No. 5,038,218, issued Aug. 6, 1991 to Matsumoto; Sharp U.S. Pat. No. 5,021,892, issued Jun. 4, 1991 to Kita, et al.; and IBM Corp. U.S. Pat. No. 4,623,244, issued Nov. 18, 1986 to D. R. Andrews, et al., originally filed Oct. 4, 1976 (see, e.g., Col. 55). Such plural mode or combination printers are commercially available, e.g., the Xerox Corporation "DocuTech", the Fuji Xerox Co. Ltd. "Able" TM machine series (Able TM 3311, etc.) [Xerox 3010], the Canon "Navigator", and the Okidata "Doc.lt" multifunctional ["combo"] product announced Oct. 28, 1992. The latter allegedly provides simultaneous fax, printer, scanner, and copier capabilities, and includes a controller and image processing board that plugs into a user's PC. Faxes are received on the PC's hard disk. Another such multimode unit is the Xerox Corp. "7033" recently announced as a LAN fax server, scanner, copier, LAN print server, and/or digital printer-all in one network-ready unit. This multifunctional and "turnkey" solution integrates various components within a "NetWare TM" environment. A server board can be installed in the "7033" machine to allow a direct connection to the network (via Ethernet or token ring), and the machine can be attached directly to the network (like a network-ready printer), without having to dedicate a PC. The fax software provides shared users access to all of the "7033" terminal's features from their workstations. The fax terminal's software package is named "XPCONSOL" and is a menu-driven software which looks and feels like "PCONSOLE" and likewise, may be used to set up the "7033" as a network print server. The "7033" can handle both addressed and unaddressed incoming faxes. Network workstations can fax from the command line, an application, windows, or the copier-scanner itself. Other new multifunctional units include Xerox' DocuCenters 20 and 35 as well as the Ricoh DS95330, and Canon GP55 series.

Of further "mailbox" interest, in Seiko Epson Corporation U.S. Pat. No. 5,141,222 issued Aug. 25, 1992 by Shigeru Sawada, et al., (and its equivalent EPO Application No. 0 399 565 "Printer" published Nov. 28, 1990), a modular unit sorter is generally indicated in Col. 1 to be for sharing a printer with a plurality of users, sorting and compiling copies by user. It claims an output sorter having fixed trays and a pivotable sorter guide member for directing copy sheets to a sorter tray. Each tray may also have a gate mechanism for retaining sheets in the tray. It is suggested in Col. 6 that a mailbox can be assigned or dedicated to each user, and used as a "mailbox" by entering an ID code and printing data. This reference is also of interest re detecting the fullness of a sorter bin and for delivering copy sheets to the next available sorter bin. I.e., also disclosed in said U.S. Pat. No. 5,141,222 reference Col. 8 are means for detecting the fullness [reaching of sheet stacking capacity] of a tray and incrementing this sorter tray copy sheet guide to another (empty) sorter tray. As noted, another example of that is disclosed in that above-cited Canon U.S. Pat. No. 4,501,419, issued Feb. 26, 1985 to Y. Takahashi, et al. (also cited herein re its bin entry gating and its bin display features).

Printer products noted with integral open sorter bins [the bin selection system is not known] include the Canon NP-9030 sold for several years with a sorter option; the Kyocera F-2010 and F-3010 laser printers with their 5 bin sorter option (since 1988?); and Oce van der Grinten Corporation's recently commercially displayed "6750" and "6800" printers configurable with either 20 or 40 bin optional programmable sorter/mailboxes. Toshiba and its OEM Genicon recently announced a 10 bin "mailbox sorter" for their network printers, supported by a Windows driver. The Toshiba user selects a bin number from the driver menu (not the network). Thus, users all have to agree among themselves who gets what bins. The Genicon system allows the network administrator to assign bins.

Variable/dynamic assignment of mailbox bins is discussed in U.S. patent application Ser. No. 08/585,079, entitled "Sheet Stacking Bin Fullness Control System" and filed originally as a provisional application (Ser. No. 004,825) on Oct. 5, 1995 by Mandel et al. As indicated by the '079 Application:

As variously taught by above-cited patents, the disclosed mailboxing system can provide for stacking the sheets sequentially outputted from the printer 14 in separate job sets into one or more temporarily and/or variably reassignable mailboxes 11 of the mailboxing or job sorting accessory unit. This assignment can be by a mailbox controller 100 controlling a sheet distribution system such as 16, automatically and/or with keypad 102 and/or display 104 entry by a user or system administrator, and/or with initial setups in NVM by the installer, and/or or remote terminal electronic setups or changes such as from remote workstations 15. The setups and/or defaults can be for the entire mailbox or for individual bins. As will be further discussed, the system setup my may include assigning more than one user to one or more bins, e.g. a workgroup or team and/or a secretary may share bins. Some or all of the assigned mailboxing units or bins thereof may have "privacy doors" which are normally locked to restrict access to at least some of the mailbox bins, with electrical unlocking of selected bins privacy doors in response to entry of a access code for that user on the keypad 102 or elsewhere, and/or other features, as also described in the above cited mailbox patents.

As taught in those cited patents, what is normally desired for the output for each utilized mailbox bin is plural, precompiled, preferably offset (and/or pre-stapled) job sets stacked in selected bins respectively assigned to respective users of the printer 14. What is also desirable is an automatic overflow assignment system of additional temporarily designated bin(s), as needed, to provide effectively unlimited or "virtual bin" plural job stacking. As will be further described, this bin reassignment and/or job overflow system is preferably integral with and controlled by the disclosed bin full and/or bin-almost-full sensing systems herein. As is also described in said cited mailbox patents, a variable display such as 104 may be provided to indicate the assigned bin and any overflow bins into which that particular users print jobs have been placed last and not yet removed. This instructional display can also be on the respective user terminal 15 display (FIG. 6). That is, the mailbox system or system server can automatically generate network messages sent back to the user's (job senders) terminal 15, and/or to the systems administrator terminal 15, if desired, so that the terminal 15 screen displays a status message like "your print job is completed—remove it from bins #3 and 4"; or "the printer is out of paper"; or "all bins are full—clear bins to continue printing", and the like.

As further described in said U.S. PAT. No. 5,328,169 and related patents, one aspect of such a "dynamic" (variable) user bin assignment system is that each "mailbox" (separate bin to be utilized therefor) can be frequently checked (updated) for reassignment of that bin to a new user. That is, reassignment to other users of bins which have since become available by the removal of all the printer output sheets therefrom by the previous user of those bins. The mailbox controller 100 can periodically interrogate the bin-empty sensors 40 to see which bins 11 are then empty. This interrogation is preferably done each time the printer and/or print server is sent (and/or is preparing to print) a print job. Unlike a sorter or collator, it is not necessary to free up (empty) a whole series of bins. Any one free bin can be fed job sheets, even if that one empty bin is between other, unemptied, bins. The bins assigned are then stored in memory, and can be identified whenever jobs are to be retrieved. However, as discussed elsewhere herein, there are situations is which having only a bin-empty sensor can be inadequate.

Additionally, U.S. Pat. No. 5,358,238 to Mandel et al. discloses a dynamic "mailboxing" unit and system for separating by users the sheet outputs of various users of a shared users printer (including facsimile receivers, copiers or combination units). The unit and system provide for stacking the sheets sequentially outputted from the printer in separate job sets into one or more temporarily and variably assigned "mailboxes" of a "mailboxing" job sorting accessory unit having a number of variably assignable "mailbox" bins.

There are assignment situations which are not believed to be addressed by the prior art:

In one example, a user may wish to have an output of their job delivered to a mailbox bin even when such output would not normally be delivered to a mailbox bin. In particular, the developer of a copy job, in which a hardcopy is scanned for delivery of prints to an output tray, may desire an approach in which the job output is delivered to a mailbox bin in view of a current state of a host copier upon which the copy job is being developed. For multifunctional copiers with secured boxes intended for use in receiving prints from print jobs, rather than copy jobs, however, this is not believed to be an approach that is normally made available. It would be desirable to provide copy job developers with the opportunity, under certain circumstances, to deliver his/her copy job to a mailbox which would normally be configured for a print job.

In another related example, the user of a mailboxing system may desire to deliver one type of job to a first set of one or more mailbox bins and another type of job to a second set of one or more mailbox bins. In particular, a user may develop one job that is preferably delivered to a nonsecured bin and another job that is preferably delivered to a secured bin. It would be desirable to provide the user with the ability to dynamically control the one or more mailbox bins to which the job is to be delivered.

In yet another related example, the number of mailbox bins available in a given system may be exceeded by the number of users who wish to access such bins. That is, during a given time interval, X users may seek to use Y bins where Y is significantly greater than X. Among the X users, however, there may be some users that should be provided with immediate preferential treatment. Moreover, certain users, due to a certain affiliation, e.g. being affiliated with the same workgroup, may be in a position to share a given secured mailbox bin rather than demand exclusive use of a single secured mailbox bin. In other instances, where a user is denied access to either a private or group shared bin, s/he may be in a position to have a corresponding job routed, at least on a one time basis, to a bin made available to the public as a whole. While it is known to configure a plurality of bins into a private group and a public group, such configuration does not accommodate for needs of users who are willing to share a bin with others, but still desire a level of privacy that is not afforded by a public bin. It would be desirable to provide a mailbox bin subsystem in which levels of use other than simply private and public are afforded.

In application of such bin configuration, it may be desirable to change bin access rights automatically. For example, it might be desirable to change access rights when one or more users fails to use a bin over a selected period of time. It is known, as a result of the disclosure of U.S. Pat. No. 5,435,544 to Mandel, that a group of mailbox bins can be monitored to determine when a job has been left in one of the bins for an unacceptable period of time. In one instance, an operator (e.g. system administrator) can be instructed to remove jobs from bins that have been deposited in the bins more than 24 hours earlier.

The presently disclosed system may be readily operated and controlled in a conventional manner with conventional control systems. It is well known in general and preferable to program and execute such control functions and logic with conventional software instructions for conventional microprocessors. This is taught by various patents such as U.S. Pat. No. 4,475,156 and art cited therein, and various commercial facsimile machines, copiers and sorters. Such software may of course vary considerably depending on the particular function and the particular software system and the particular microprocessor or microcomputer system being utilized, but will be available to or readily programmable by those skilled in the applicable arts without undue experimentation from either verbal functional descriptions, such as those provided herein, or prior knowledge of those functions which are conventional, together with general knowledge in the software and computer arts. Controls may alternatively be provided utilizing various other known or suitable hard-wired logic or switching systems.

Other mailboxing patents which might be useful to an understanding of the present disclosure include U.S. Pat. No. 5,551,686 to Sanchez et al. (Issued: Sep. 3, 1996), U.S. Pat. No. 5,547,178 to Costello (Issued: Aug. 20, 1996) and U.S. Pat. No. 5,342,034 to Mandel et al. (Issued: Aug. 30, 1994). All references cited in this specification, and their references, are incorporated by reference herein where appropriate for appropriate teachings of additional or alternative details, features, and/or technical background.

SUMMARY OF THE INVENTION

In accordance with one aspect of the present invention there is provided a job routing system for a printing system having a mailbox bin subsystem with one or more mailbox bins and a first memory location at which a first job, including a first set of image data, is stored. The printing system includes an image capture subsystem for reading a hardcopy document with image related information and creating a second job including a second set of image data based on the information contained in the document. The printing system further includes a print engine for producing a first set of prints based on the first set of image data stored at the first memory location. The job routing system, which is capable of routing the second set of image data of the second job to a second memory location, while the prints of the first set of prints are being produced with the first set of image data of the first memory location, to produce a second set of prints representative of the second set of image data, comprises: (a) a controller providing a set of information including an indication to a user of the printing system that the print engine is busy producing the first set of prints with the first set of image data of the first memory location; and (b) a user interface for receiving the set of information, the printing system user, in response to receiving the set of information, directing said controller, with said user interface to cause the second set of prints to be (i) produced subsequent to said producing of the first set of prints and (ii) delivered to one of the one or more mailbox bins.

In accordance with another aspect of the present invention there is provided a job routing system for a printing system with a first memory location at which a first job, including a first set of image data, is stored. The printing system includes an image capture subsystem for reading a hardcopy document with image related information and creating a second job including a second set of image data based on the information contained in the document. The printing system further includes a print engine for producing a first set of prints based on the first set of image data stored at the first memory location. The job routing system, which is capable of routing the second set of image data of the second job to a second memory location, while the prints of the first set of prints are being produced with the first set of image data of the first memory location, to produce a second set of prints representative of the second set of image data, comprises: (a) a controller providing a set of information indicating to a user of the printing system that the print engine is busy producing the first set of prints with the first set of image data of the first memory location; (b) an output area for receiving the first set of prints (b) a network; (c) a subsystem, disposed on said network remotely of the output area, for storing image data and/or outputting prints on a basis of stored image data; and (d) a user interface for receiving the set of information, the printing system user, in response to receiving the set of information, directing said controller, with said user interface, to cause the second set of image data to be delivered to said subsystem for storage of the second set of image data and/or production of the second set of prints.

DESCRIPTION OF PREFERRED EMBODIMENT(S)

While the present invention will hereinafter be described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

Figure 1:
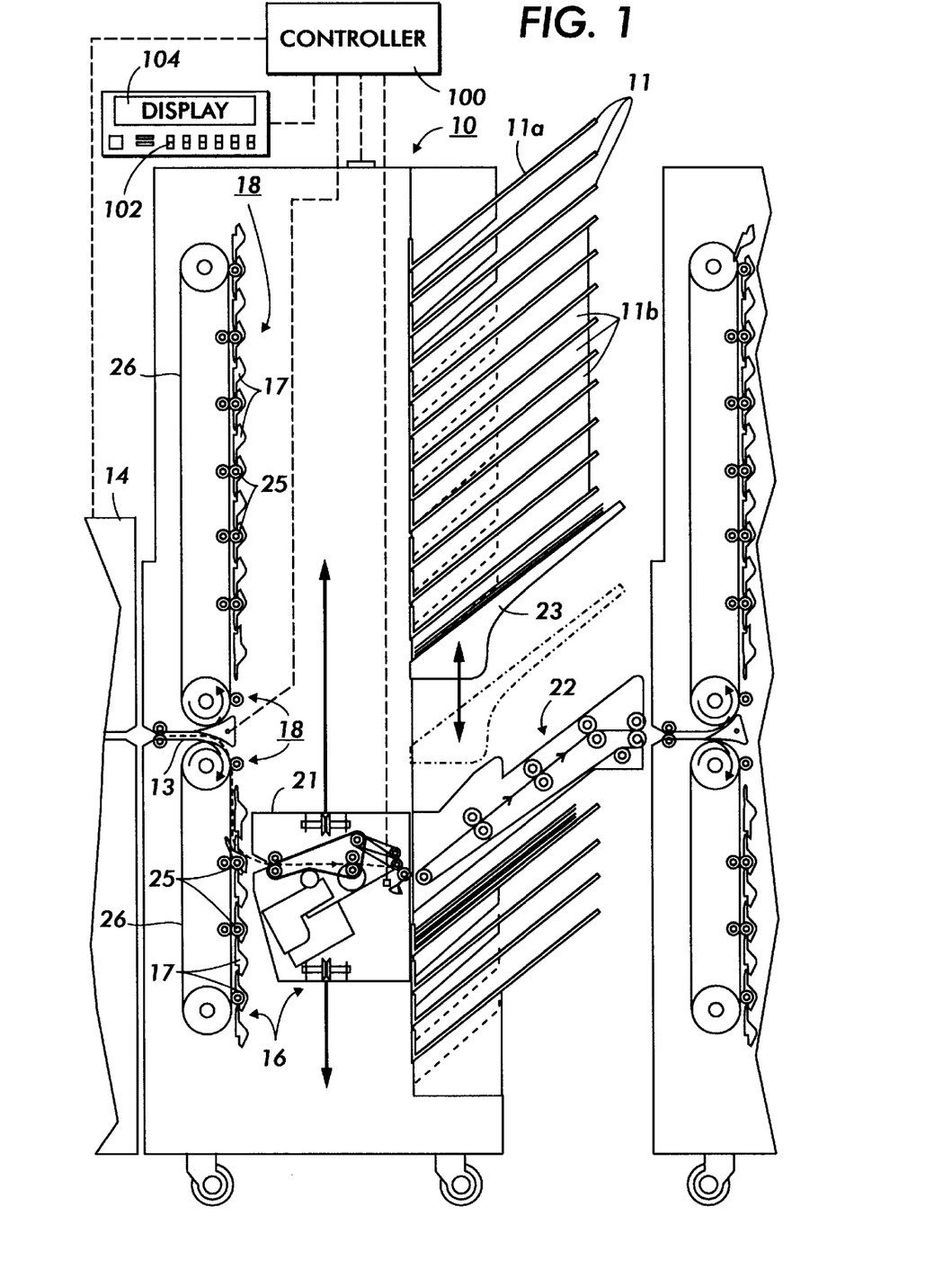
FIG. 1 is an elevational view of one example of a multibin array "mailboxing system unit connecting with the sheet output of a printer (partially shown schematically) with an example of a repositionable sheet transport and bin selection or distribution system.

Referring to FIG. 1, an exemplary embodiment of a mailbox unit is designated with the numeral 10. The mailbox bins, 11, 11a, 11b, etc., illustrated or described herein are also merely exemplary, and may vary considerably. The general reference number 11 is used throughout for any individual mailbox (bin). Bin 11a here is an open overflow bin, conventionally located here as the top bin. In one example, the Bin 11a could be employed as a high capacity bin. This top bin or tray 11a of the unit 10 may conventionally provide an open or "public" bin. A top bin is commonly used for undesignated or unknown user's jobs, job overflows, jam purges, etc., since it is not limited in stack height by any overlying tray. Bins 11b here schematically represents some examples of restricted access mailbox bins 11 which are lockable and unlockable, e.g. have latched privacy doors, as described further in the above cited patents thereon.

Figure 2:
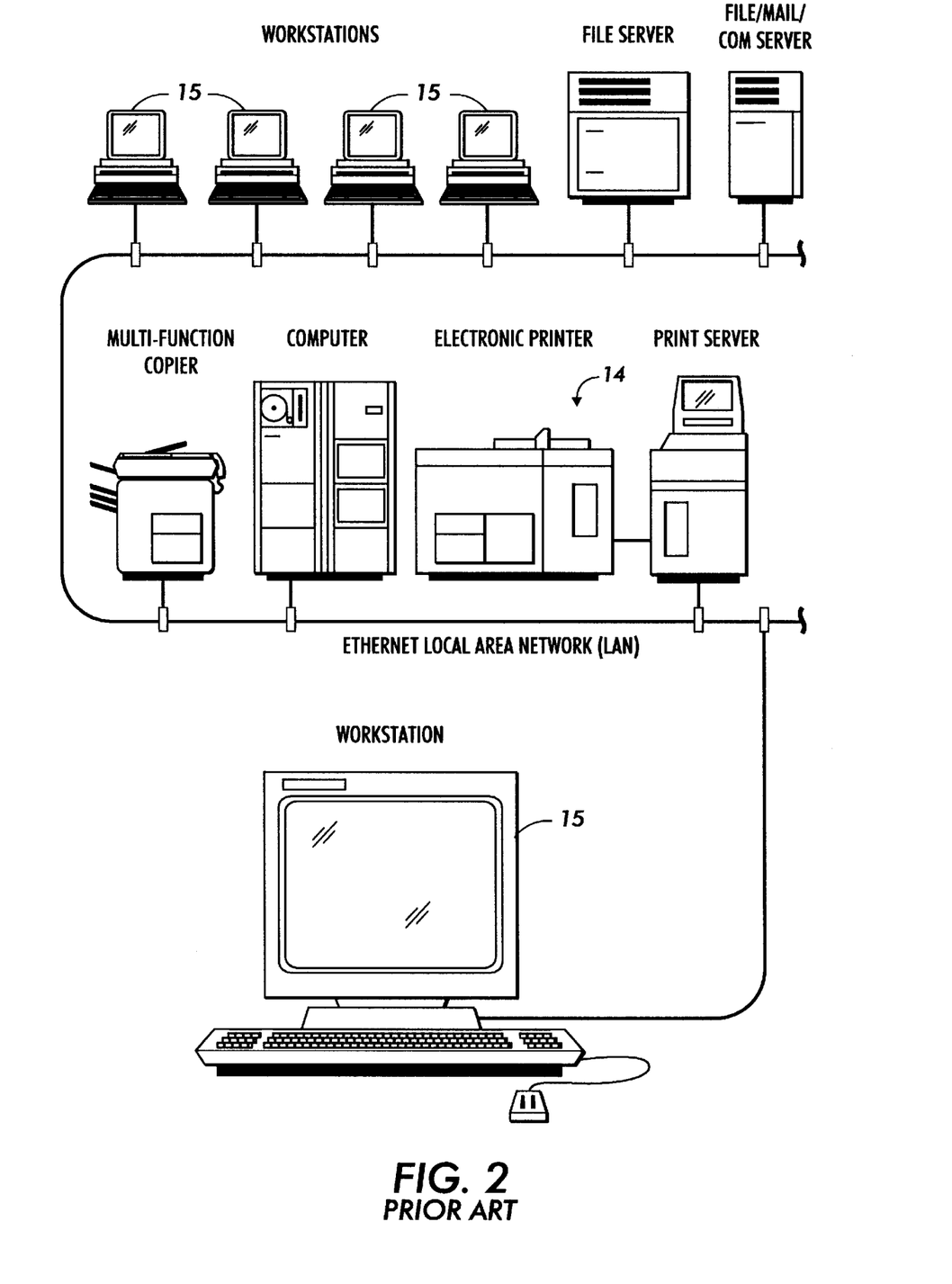
FIG. 2, labeled "prior art", is a schematic overall view of one example of an electronically networked system of plural users (plural workstations) sharing an electronic printer and a multifunctional digital copier with a digital front end.

Various printers (of which printer 14 in FIGS. 1 and 2 is merely one schematic example) may be connected to these and other mailboxing systems, with little or no printer modifications, as part of various systems. In FIG. 2, merely by way of an example of systems applications, the exemplary shared user electronic printer 14 is shown connected into a conventional prior art inneroffice or interoffice system electronic network with various remote user terminals (workstations) 15, one of which is shown here in an enlarged view. Some other possible typical network system components are also illustrated and labeled. For example, a multifunctional printing system, including, printing copying and faxing functionality, is shown. A discussion of network printing is provided in U.S. Pat. No. 5,358,238 to Mandel et al.

Preferably the mailbox unit has a sheet input or entrance such as 13 which adapts or adjusts to common or various printer output levels, or an interface unit or interconnect transport may be provided in a known manner to sequentially feed the printer output sheets from the printer 14 into the mailbox unit 10 sheet entrance 13. Alternatively, the mailbox unit can be integral with the printer unit, built into or attached above or to one end thereof, such as by conventionally integral cantilever mounting to or above the output end of the printer 14, like certain known sorters. The conventionally sequentially received hard copy of plural page documents from the pre-collation output electronic printer 14 or the like is thus fed into the mailbox unit 10, along with any added or interposed insert sheets, such as covers, tab sheets or color photographs, to make up desired print jobs. The path of these sheets in the mailbox unit is via a sheet distribution system 16 automatically controlled by a controller 100, or otherwise, for the particular bin 11 assignment or destination of the particular job sheets. As noted previously, and extensively discussed in above-cited patents, the mailbox unit 10 preferably directs all designated sheets of a users job to an available bin or bins 11 which are temporarily assigned to that particular printer user, based on bins availability, which may be an empty bin or a bin which is not yet full.

Preferably, each bin 11 has an individual "bin empty" sensor (not shown herein), such as that described in Xerox Corp. U.S. Pat. No. 5,328,169 issued Jul. 12, 1994 to Mandel, each of which bin empty sensor communicates with controller 100. This enables the sheet path control bin selection system of the mailbox unit 10 to know immediately when any bin has been fully cleared by anyone (a printer user, print job or facsimile addressee, recipient, system administrator, etc.). Thus, any empty bin can be refilled with further print jobs for the same designee(s), or immediately reassigned to a new user, job addressee or recipient. This is the case even where the same mailbox bin or bins may be allowed to shared by more than one user or addressee, since, notwithstanding directions or displays to the contrary, any user or addressee with access to that bin could remove all the print jobs in that bin, not just his or her own print jobs. However, if only his or her own print jobs are removed from that shared bin, and there are any print jobs for others left remaining in that bin, or reinserted back into that bin, the bin empty sensor cannot tell how much material was removed, or how much stacking space is thus now available, as even a single remaining sheet in the bin will block such a bin empty sensor.

A bin fullness sensor, such as those described herein, or others, could be modified to additionally sense empty, and thus fully available, bins, and eliminate any need for separate bin empty sensors. E.g., by providing for the end of the stack height sensor arm extending into the bin to partially drop though a hole or slot in the bin tray bottom to an arm position triggering another optical or other sensor for that bin empty arm position, as is well known in the set separator sensor art for recirculating document handler trays. However, since here a single stack height sensor is desired to be used and shared for all the bins in the array of bins, that would require this single sensor to be frequently moved up and down the array of bins to check for emptied bins. That would reduce productivity while that is being done.

Thus here, bin empty sensing is combinable with, but distinct from, the presently disclosed system for checking for full or almost full bins, since the single stack height sensor disclosed here for that function in mailbox units is mounted on, and moves with, the mailbox carriage unit 21 which is part of the sheet distribution system 16 directing sheets into the particular bin 11 which is then being filled here. Thus, the stack height sensor system here is already automatically located adjacent to the particular bin 11 who's stack height needs to be sensed or measured during filling since it is the bin being filled at that time. However, unlike bin filling, as to bin emptying, any mailbox bin 11 may be manually emptied at any time, unless it is a locked bin 11b. Even if the controller 100 receives an unlocking signal or password, it will only know which bins 11b have been unlocked then, and will not know whether or not those unlocked bins have actually been either partially or fully emptied, unless there is a bin empty detection or sensing signal from that bin.

Referring further to the illustrated exemplary mailbox unit 10 in FIG. 1, this is a universal stand-alone unit that is attached to, or simply moved next to, the output of almost any conventional printer. This particular illustrated mailbox unit 10 is basically that shown and described in the above cited and incorporated prior Xerox Corporation mailbox unit U.S. Pat. Nos. 5,382,012 issued Jan. 17, 1995, and 5,370,384 issued Dec. 6, 1994, and thus need not be re-described in detail here. This particular mailbox unit 10 has plural fixed bins 11, into which either single sheets, or collated and stapled or unstapled job sets of multiple sheets, are selectively fed by a sheet distribution system 16, here including a vertically repositionable (movable) bin selector carriage 21. As further described and disclosed in above cited prior patents, the movable carriage 21 comprises an integral sheet set collator and finisher unit which may be called a finishing carriage. The selected vertical position of the finishing carriage 21 here also serves to cam actuate the selected corresponding position sheet deflector gate 17 in the sheet vertical transport path 18 on the upstream side of the finishing carriage 21, so as to select the sheet path from the transport path 18 through the carriage 21 into the adjacent selected bin 11. The belts 26 of the vertical transport 18 are laterally spaced apart so that the fingers of the selected gate 17 may pivotally extend between the belts 26 when that gate 17 is actuated. The particular vertical transport 18 here has sets of both up and down flights of moving belts 26, each with mating belt rollers 25, to allow for the mailbox unit 10 sheet entrance 13 to be centralized by entering in between these up and down belt flights.

This internal sheet feeding and/or sheet distribution system in the mailbox unit can utilize various other alternative different known random access bin selector type sorter sheet transports, many of which are known in the art. Various well known feeding and gating arrangements whereby inputted sheets are fed to and gated into selected bins include, for example, a moving gate sheet deflector system without a compiler or finisher, such as is disclosed in Norfin Co. U.S. Pat. No. 3,414,254 to Snelling, et al.

The collator, stapler and stapling system on the finishing carriage 21 may be, for example, that further described in Xerox Corporation U.S. Pat. No. 5,398,918 issued Mar. 21, 1995, to C. Rizzolo, et al. It provides stapling in one or more locations selected by linear movement of a stapling head along a stapling line, which line position may be preset to a small fixed distance parallel to one edge of the compiled set. Thus, as finished sets are stacked into a bin 11 from the finishing carriage 21, any staples in the print job set are known to be somewhere along a known position line.

As is also shown here with this exemplary mailbox unit 10 in FIG. 1, additional mailbox units such as 10 can be extended or serially connected to provide additional sets of available bins 11, where desired, as is well known in sorting. That is, plural mailbox units 10 may be ganged in series like plural sorter units using sheet pass-through or bypass feeders such as 22 shown here. This is further described in said Xerox Corporation U.S. Pat. Nos. 5,382,012 and 5,370,384.

The relatively low capacity (e.g., less than 100 normal sheets) mailbox bins 11 normally used for separating by users their plural printing jobs, which may include copy or fax jobs, may also be supplemented by optional or overflow sheet delivery into a high sheet capacity stacking tray system, such as the FIG. 1 elevator stacking tray 23, which is desirably part of the same vertical array of bins, and desirably selected and fed sheets or sets of sheets by the same sheet distribution system 16. That can be an optional module mounted onto the same frame in place of one or more of the mailbox bins 11, as disclosed in above-cited patents, especially U.S. Pat. No. 5,382,012 or 5,370,384. The structure and operation of such an elevator stacking tray 23 is well known per se, and described in some of the above cited patents. An elevator motor system connecting with the elevator tray 23 maintains the top of the stack of accumulating sheets thereon at a suitable height below the sheet input to that stack, which here is the exit or eject rollers nip of the finishing carriage 21. This typically requires a separate sensor and sensing arm to sense the stack height in the elevator tray 23 to control the actuation of the tray elevator motor.

It will be appreciated that the stacking height or sheet capacity of the bins in any given mailbox unit may vary. A sorter or mailbox may have repositionable trays for changing their spacing. Furthermore, certain bins such as lockable mailbox bins or bins with privacy doors may have a somewhat smaller usable available spacing between bins and/or stacking height and thus bin capacity, due to thicker tray materials, the bin door locking mechanisms, or the set removal system from the tray, etc. Privacy door restricted access bins are described in detail in the above cited patents, and schematically shown at 11b in FIG. 1. Bins which are to be shared by more than one user might be higher capacity bins than those bins which will not be shared. As discussed, the top bin typically is an overflow bin with much higher maximum stacking level or capacity, since there is no overlying or superposed tray. Additional overflow or large jobs stacking can be provided by a special stacking tray, as exemplified by the high capacity elevator stacking tray 23 shown in FIG. 1 and further described herein.

As variously taught by above-cited patents, the disclosed mailboxing system can provide for stacking the sheets sequentially outputted from the printer 14 in separate job sets into one or more temporarily and/or variably reassignable mailboxes 11 of the mailboxing or job sorting accessory unit. This assignment can be by a mailbox controller 100 controlling a sheet distribution system such as 16, automatically and/or with keypad 102 and/or display 104 entry by a user or system administrator, and/or with initial setups in NVM by the installer, and/or or remote terminal electronic setups or changes such as from remote workstations 15. The setups and/or defaults can be for the entire mailbox or for individual bins. As will be further discussed, the system setup may include assigning more than one user to one or more bins, e.g. a workgroup or team and/or a secretary may share bins. Some or all of the assigned mailboxing units or bins thereof may have "privacy doors" which are normally locked to restrict access to at least some of the mailbox bins, with electrical unlocking of selected bins privacy doors in response to entry of a access code for that user on the keypad 102 or elsewhere, and/or other features, as also described in the above cited mailbox patents.

As taught in those cited patents, what is normally desired for the output for each utilized mailbox bin is plural, pre-compiled, preferably offset (and/or pre-stapled) job sets stacked in selected bins respectively assigned to respective users of the printer 14. What is also desirable is an automatic overflow assignment system of additional temporarily designated bin(s), as needed, to provide effectively unlimited or "virtual bin" plural job stacking. As will be further described, this bin reassignment and/or job overflow system is preferably integral with and controlled by the disclosed bin full and/or bin-almost-full sensing systems herein. As is also described in said cited mailbox patents, a variable display such as 104 may be provided to indicate the assigned bin and any overflow bins into which that particular users print jobs have been placed last and not yet removed. This instructional display can also be on the respective user terminal 15 display (FIG. 2). That is, the mailbox system or system server can automatically generate network messages sent back to the user's (job senders) terminal 15, and/or to the systems administrator terminal 15, if desired, so that the terminal 15 screen displays a status message like "your print job is completed—remove it from bins #3 and 4"; or "the printer is out of paper"; or "all bins are full—clear bins to continue printing", and the like.

As further described in said U.S. Pat. No. 5,328,169 and related patents, one aspect of such a "dynamic" (variable) user bin assignment system is that each "mailbox" (separate bin to be utilized therefor) can be frequently checked (updated) for reassignment of that bin to a new user. That is, reassignment to other users of bins which have since become available by the removal of all the printer output sheets therefrom by the previous user of those bins. The mailbox controller 100 can periodically interrogate the bin-empty sensors 40 to see which bins 11 are then empty. This interrogation is preferably done each time the printer and/or print server is sent (and/or is preparing to print) a print job. Unlike a sorter or collator, it is not necessary to free up (empty) a whole series of bins. Any one free bin can be fed job sheets, even if that one empty bin is between other, unemptied, bins. The bins assigned are then stored in memory, and can be identified whenever jobs are to be retrieved. However, as discussed elsewhere herein, there are situations is which having only a bin-empty sensor can be inadequate.

Figure 3:
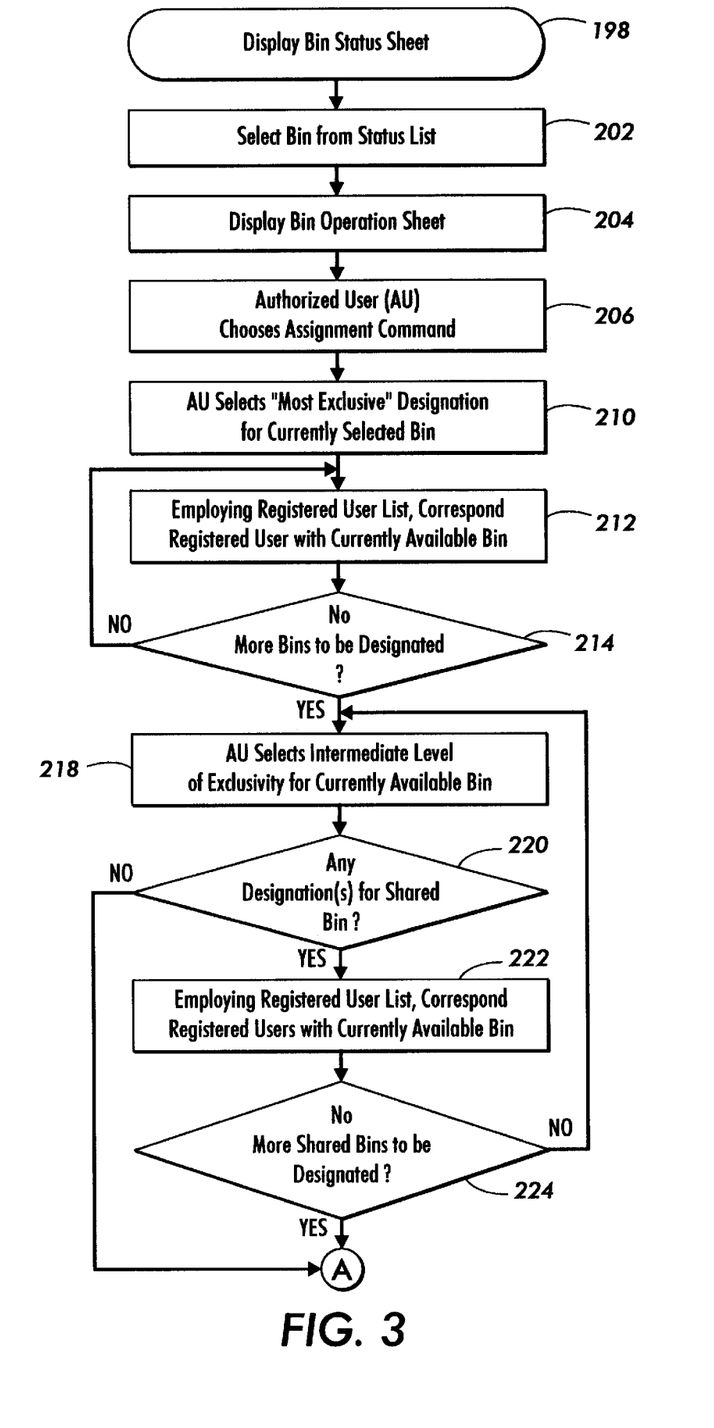
FIGS. 3 and 4 comprise a flow diagram illustrating a technique for assigning bin access designators to selected groups of mailbox bins.
Figure 4:
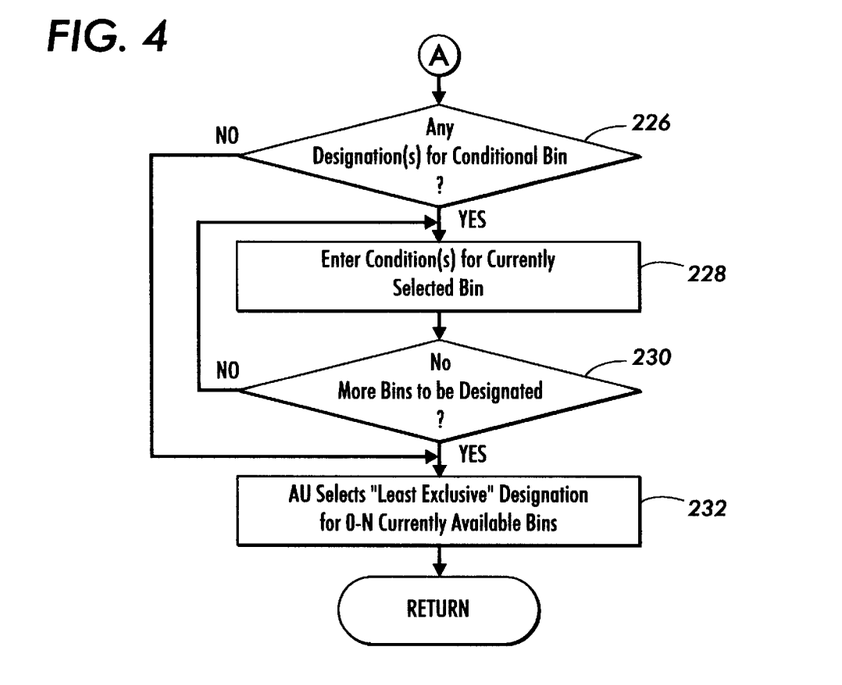
Figure 5:
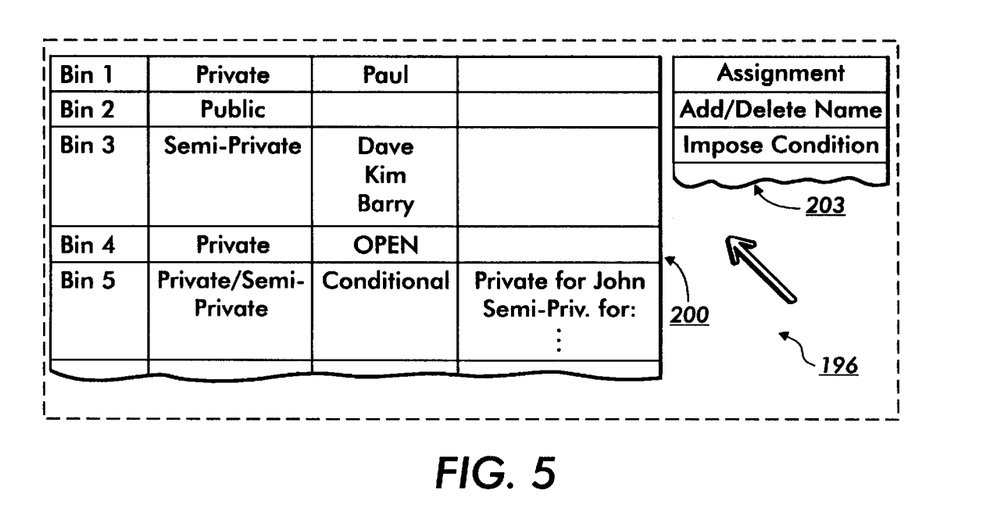
FIG. 5 is a schematic elevational view of a dialog used to facilitate the bin assignment technique portrayed in FIGS. 3 and 4.

Referring to FIGS. 3–6, a system for assigning mailbox bins by an authorized user or system administrator, and controlling the delivery of sheets to such bins, is shown. Referring specifically to FIGS. 3 and 5, an approach for designating bin groups, according to use type, is discussed in detail. For initial setup, a bin assignment dialog 196, which indicates those bins available for configuration/ reconfiguration, is displayed at step 198. In the illustrated approach of FIG. 3, one of the bins is selected from a list 200 (FIG. 5)—the list being representative of a window into a database (step 202 of FIG. 3)—and a sheet 203, designating what operations can be performed on the bins in the database window, is displayed by way of step 204. As shown in FIG. 5, the list of operations includes a bin assignment command, which command is selected, at step 206, by an authorized user. In the illustrated technique of FIGS. 3 and 4, the dialog 196 is opened once and maintained in the open state throughout the assignment process; however, it is contemplated that the dialog could be opened and closed throughout the process depending on design choice.

Referring specifically to the list 200 of FIG. 5, some of the bins are corresponded with a bin access designator. For example, bin 1 is corresponded with a "Private" designator, bin 3 with a "Semi-priv[ate]" designator, bin 5 with a conditional designator (referred to, in one example, as "Priv./Semi-Priv.") and bin 2 with a "Public" designator— the significance of these designators, as they appear in the priority of (1) private, (2) semi-private, (3) conditional and (4) public will appear from the following discussion of FIGS. 3 and 4.

It should be understood that a bin access designator dictates the exclusivity which is to be accorded one or more mailbox or print receiving bins. As discussed in the above-mentioned mailboxing patents, a bin may have a particularly high level of exclusivity in that it is intended to be employed for single, private use or a particularly low level of exclusivity in that it is intended to be accessed by any member of the public. Semi-private boxes are typically used by a group that is related through a common purpose—for example each member of the group may be part of a common "workgroup". A Semi-private box may also be one in which the exclusivity of the box depends on the occurrence of an event or condition. While the present description addresses four levels of exclusivity, the precepts underlying the preferred embodiment would not be undermined by use of more or less than four levels of exclusivity.

Additionally, it should be appreciated that a private or semi-private box can be locked or open. Two locking systems, namely a mechanical locking system and an electronic locking system are contemplated by the preferred embodiment—a mechanical locking system is disclosed by the mailboxing patents above. The electronic locking system is directed toward an approach in which a job is held in memory until a password is provided by a selected user at a suitable interface. A hold and release system of this type is disclosed in U.S. Pat. No. 4,843,571, the disclosure of which is incorporated herein by reference.

At step 210, the AU selects one of the lines in the list 200 (FIG. 5) and provides the corresponding bin with a most exclusive or "Private" designation. In configuring the selected bin, the AU preferably accesses a list of registered users (not shown) including candidates for assignment to bins of the mailbox bin subsystem. A name from the list is then corresponded with the selected bin.

Storage of a user list and appropriate employment of such list is well known in the art. For example in one version of Microsoft Mail, a user addresses mail items through use of a list referred to as an "address book". Additionally, as mentioned above, the list 200 is preferably part of a data base which can be subjected readily to search operations. Thus, if "Paul" is assigned to bin 1, a suitable search request, as discussed in further detail below, permits delivery to Paul's bin by use of the database. As each bin selected with step 210 is configured, via step 212, it is determined, via step 214, whether any more bins are to be designated with the Private bin access designator.

If no further bin access designators are to be assigned in the most exclusive or Private category, then the process permits the AU, via step 218, to select a bin for designation at an intermediate or "Semi-private" level of exclusivity. Provided that the Semi-private bin is intended for use as a shared bin (see step 220), the Semi-private or "Shared" bin is configured with a group of user names by reference to a suitable registered user list. In an approach contemplated by the preferred embodiment, a name can be added or deleted from the group of user names by suitable use of the sheet 203 (FIG. 5) in conjunction with the list 200. In one instance, the user name group of bin 4 could be modified by selecting "Dave" and deleting the same with the "Delete" command of sheet 203. Referring to step 224, assuming that no more workgroup type shared bins are to be configured, the process may move through decision 226 to step 228 where one or more conditions can be added for a currently selected bin.

One of various conditions may be set by the AU with respect to the use of one or more bins. For example, a bin may be designated as a workgroup shared bin until a predesignated user indicates with suitable input (e.g. one or more signals) to the controller 100 (FIG. 1), that the exclusivity level of the bin is to be raised from a Semi-private level to the Private level. Referring to the example of FIG. 5, bin 5 is configured so that the bin is treated as a private bin for each of John's jobs, but as semi-private when an authorized workgroup participant other than John sends his/her job output to the bin 5. Other conditions are contemplated for use with conditioned boxes.

Once shared and/or conditioned bins have been designated, by use of decision step 230, the AU is free to designate any other available bin (step 232) as a "Least Exclusive" use type bin. In one example, a Least Exclusive designation for a mailbox bin would designate that the bin is made available to the public at large on a first-come first-serve basis.

Figure 6:
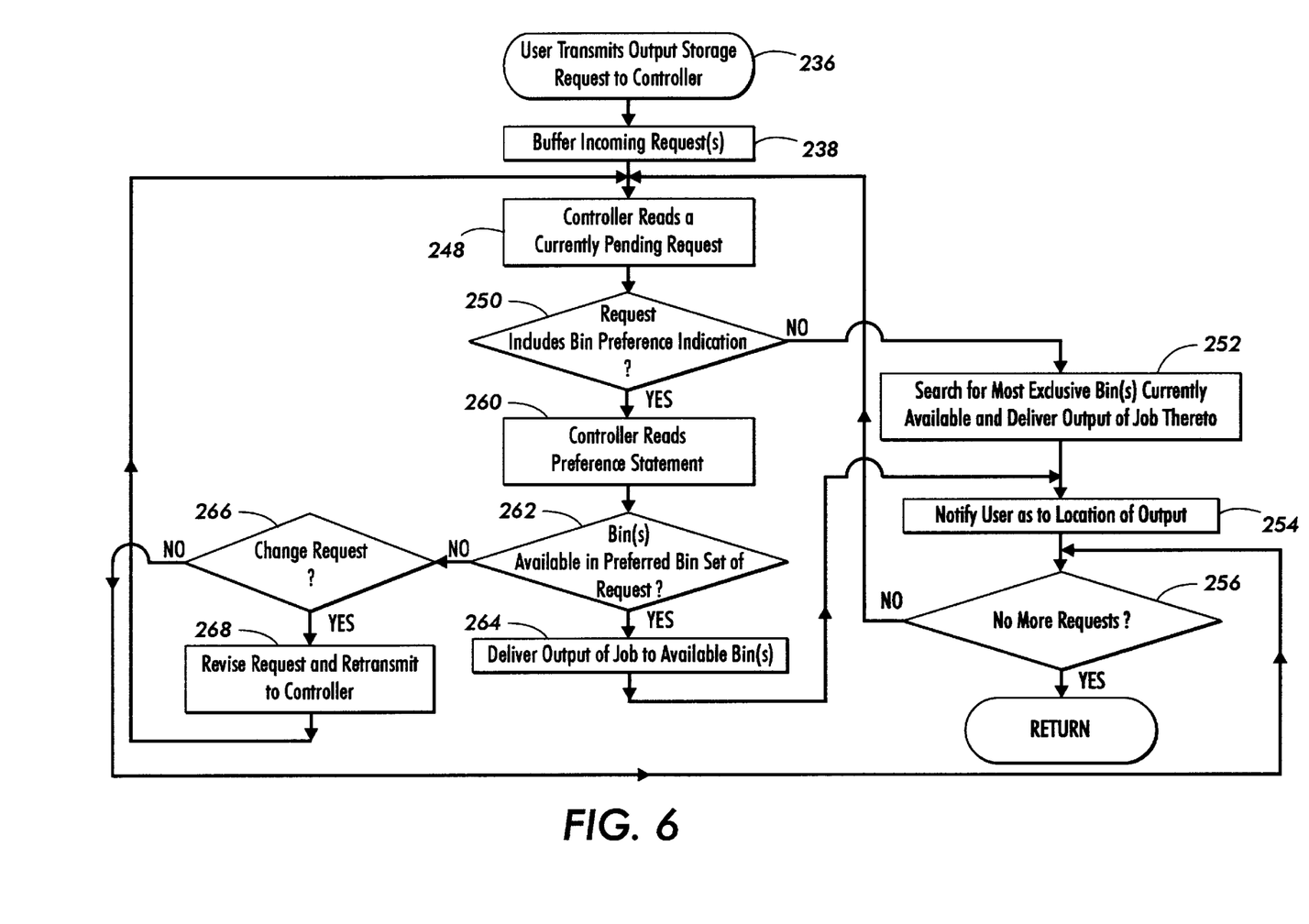
FIG. 6 is a flow diagram illustrating an interactive technique in which an output storage request is used to facilitate the delivery of job output to one or more preassigned mailbox bins.

Referring to FIG. 6, a manner of using the class designating approach of FIGS. 3 and 4 is discussed. Pursuant to developing control instructions for a document job with a suitable job ticket (of the type shown in U.S. Pat. No. 5,206,735 to Gauronski et al., the disclosure of which is incorporated herein by reference), a user desirably designates, by way of an output storage request (step 236) (also see FIG. 7) that the output of the job, i.e. prints, is to be delivered to one or more mailbox bins corresponding with one or more bin access designators. As will appear, the developer of a document job can designate, with a varying degree of specificity, which type(s) of bin(s) is to receive the document job output. In the preferred embodiment, the user stores the job ticket, including the output storage request, for future use in processing the job. It will be appreciated that the output storage request can be developed and buffered (step 238) at any time prior to delivery of the document job output to the mailbox bin subsystem of FIG. 1.

Figure 7:
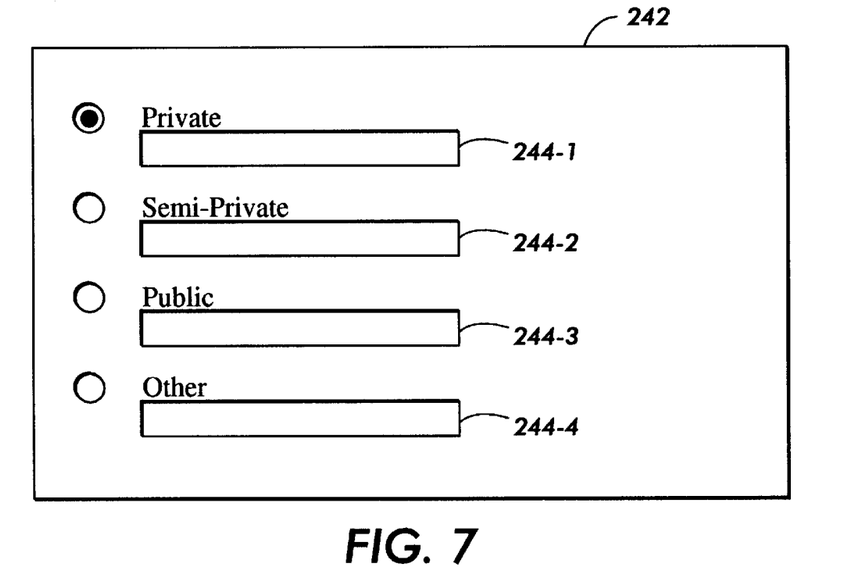
FIGS. 7–9 each include a schematic, elevational view of a dialog used to implement, in one example, the output storage request of FIG. 6.

Referring to FIG. 7, an output storage request ticket is designated by the numeral 242. Preferably, the ticket 242 permits a user to choose up to three levels of use type. The present approach contemplates a system in which the user either designates (1) none of the levels, (2) just one of the levels, (3) two of the levels, or (4) three of the levels. In the dialog of FIG. 7, the choice of a conditional bin is incorporated in the Semi-private choice, but in another embodiment, the choice of a conditional bin could be broken out into a separate choice. As explained in further detail below, each level includes an input/display area 244-X by which the user can specify bin preferences or indicate specific bins for receiving output copy(ies). In order to provide the user with an optimum level of flexibility, a choice referred to as "Other", the significance of which is discussed in further detail below, is provided. Additionally, the input/display area can be used to prompt the system to provide a user with information regarding those bins that are currently assigned to him/her. In particular, a user may query for "Paul's bins" and a search of a corresponding database, such as the database corresponding with the list 200 of FIG. 5) permits for a listing of Paul's bins, one of which, as shown in FIG. 5, includes Bin 1.

Pursuant to processing a document job, the controller 100 (FIG. 1) reads one of the requests in the buffer (step 248) and determines, at step 250, whether the request expresses a preference as to where an output of the job should be delivered. In the event that no preference is stated, then a search is performed with the controller (step 252) to determine if a Private bin is open. In the example, Bin 5 is open so the job output (i.e. prints) are transmitted thereto and, after delivery of the job output to Bin 5, the corresponding user is notified with the controller (step 254) that the job output resides therein. If no Private bins are available, then the controller continues the search to determine if any Semi-private bins are available. If a Semi-private bin is found, then prints are delivered thereto and, via step 254, the user is notified of delivery location. If no Semi-private bin is available, then the prints are delivered to a Public bin and the user is notified of the delivery location. In the illustrated embodiment of FIG. 6, open private bins are assigned to users prior to Semi-private bins and Semi-private bins are assigned prior to Public bins so as to optimize space in the public bins; however, in another embodiment public bins could be assigned prior to Semi-private bins and so on.

Figure 8:
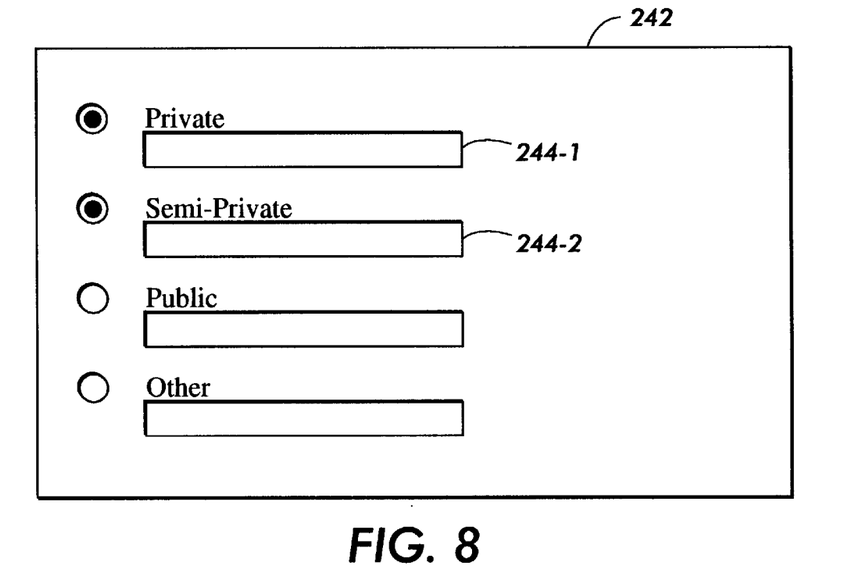

Referring again to step 250, if a request includes a preference as to print delivery, then a preference statement is read at step 260. A preference statement can assume at least one of three forms. Referring to the first form, with the dialog 242 of FIG. 7, a user may indicate that s/he wishes to deliver prints to one of either one, two or three different types of bins, i.e. the user may specify a delivery range. In the example of FIG. 8, a user has designated that the delivery range is to include Private and Semi-private bins. A search is then performed, via step 262, to determine whether a bin is available within the designated delivery range. If a bin in the delivery range is available, then delivery of output is achieved at step 264; otherwise, the user is provided with an opportunity, via step 266 and 268 to adjust the request. In the example of FIG. 8, upon learning that only Public bins are available, the user may wish to change the delivery range to Public and, shortly thereafter, visit the printer to avoid having the corresponding output mixed up with other output.

Figure 9:
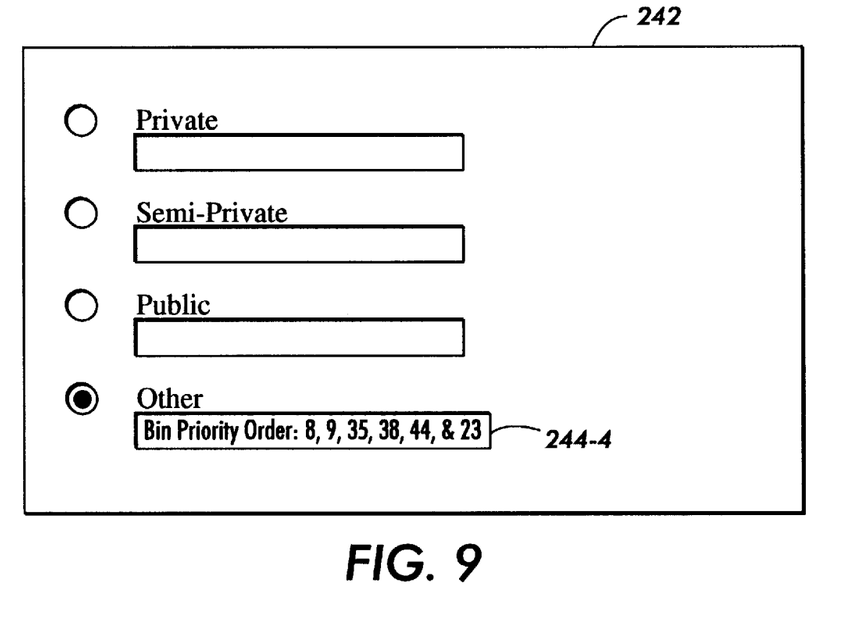

Referring to the second form of the preference statement, a user may provide a preference list by use of the Other designation. This approach is best understood by reference to an example: In a 56 bin mailbox bin subsystem, John has Private bins (#s 7, 8 and 9) and four Shared bins (#s 23, 35, 38 and 44) to which he has access—bin #9 is secured by an electronic lock while each of the other bins are nonsecured. When John sends a secure job, he specifies a preference list of "9, 7 and 8" in the input/display area 244-1 (FIG. 7). On the other hand, for non-secure jobs a bin preference list of "8, 9, 35, 38, 44 and 23" is provided in the area 244-4 of FIG. 9. In the example of FIG. 9, the user enables a priority list by providing a recognized phrase, e.g. "Bin Priority Order" and following the phrase with bins that s/he owns.

Referring to the third form of the preference statement, it should be noted that use of a preference list can greatly facilitate the distribution of a job among a wide range of recipients. For instance, referring again to the example discussed immediately above, John may wish to deliver a copy of job output to himself as well as to each group with whom he shares bins 23, 35, 38 and 44. To enable this, he would type in area 244-4: "Distribute copy(ies) to: (7, 8 or 9) and (23, 35, 38 and 44)". In this way an output copy would be delivered to one of John's bins and to each of bins 23, 35, 38 and 44. It is further contemplated that multiple copies could be transmitted to each of the bins designated in the distribution list.

Referring again to FIG. 2, as discussed in detail in now-allowed U.S. patent application Ser. No. 08/315,274 to Ambalavanar et al., the disclosure of which is incorporated herein by reference, a first document job, in the form of a first set of image data, can be captured from a network, with a suitable front end of a digital copier. In turn, a first set of prints ("print job"), representative of the first set of image, can be produced and delivered to an output tray of the copier. At the same time, a second document job ("copy job") can be developed on the digital copier by scanning a hardcopy document for developing an electronic master comprising a second set of image data.

While the first set of image data can be processed with a print engine of the copier while the second set of image data is being developed, it is preferable to produce prints from just one job at a time. This is not to say that two sets of prints could not be produced by way of interleaving (see, for example, U.S. Pat. No. 5,307,458 to Freiburg et al., the disclosure of which is incorporated herein by reference) or that the processing of the first job could not be interrupted in order to promote the processing of the second job ahead of the first job (see the Gauranski patent mentioned above). Nevertheless, interleaving may not be cost effective and, as discussed in further detail below, it may not be desirable to interrupt a job in process. For instance, it may not be possible to interrupt a job as quickly as would be desired by the developer of the copy job, and due to the importance of the currently printing job, the copy job developer may not wish to interrupt the job in process.

Figure 10:
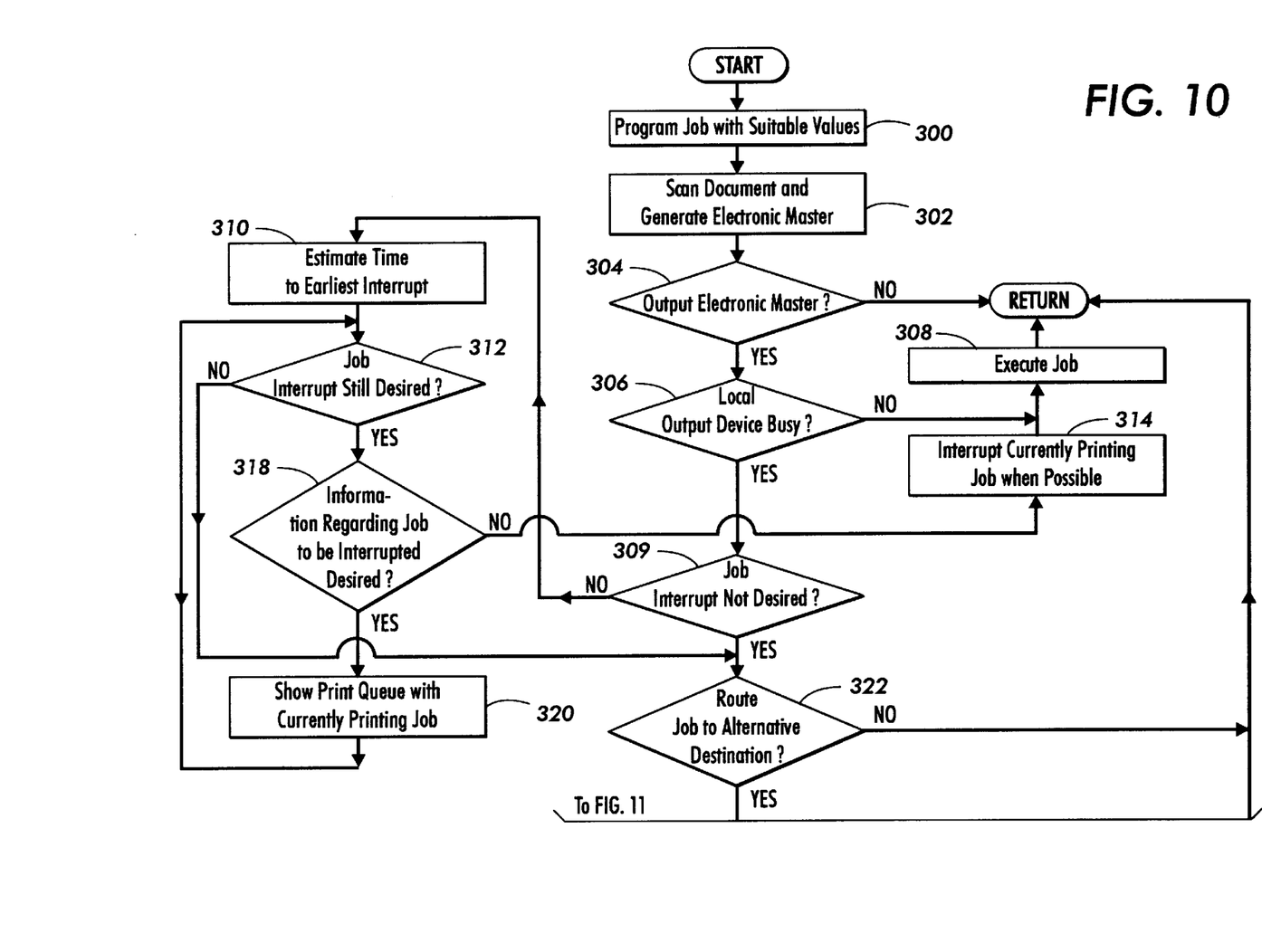
FIGS. 10 and 11 comprise a flow diagram illustrating a manner in which a copy job is routed to an alternative destination, relative to a host digital copier, when the copier is unable to immediately produce prints for the copy job because the copier is currently preoccupied with the execution of a print job.

Referring to FIG. 10, an illustrated technique which permits the copy job developer to generate image data and deliver corresponding prints to an output destination after the prints of a print job have been produced is described. At steps 300 and 302 of the illustrated technique, a user of the digital copier of FIG. 2 performs the procedure necessary to set up a scan or copy job. In particular, a suitable job ticket or dialog, such as the one shown in the Gauranski patent above, is used to program the copy job (step 300) and an electronic master, i.e. a set of image data, is generated with a suitable image capture subsystem. If, at decision 304, the copy job developer does not wish to produce prints immediately, then image data is stored, in accordance with the teachings of the above-mentioned Ambalavanar patent application, for output at a subsequent time.

If, however, the copy job developer seeks to obtain output immediately, then a check is performed at step 306, to determine if the print engine of the copier is busy (e.g., busy processing a print job). Assuming that the print engine is not busy with another job, then the copy job is executed by way of step 308. Assuming the print engine is busy, the user is provided, at step 310, with an opportunity to either route the copy job to an alternative destination or interrupt the job currently in process. Even prior to permitting an interrupt, nonetheless, the illustrated technique forces the copy job developer, at step 309, to consider the ramifications of a decision to interrupt.

More particularly, prior to permitting an interrupt, the system provides the user, at step 310, with an estimate regarding how much time will elapse before the job in progress can be interrupted. This sort of estimate can be achieved through use of an estimation scheme of the type disclosed in now-allowed U.S. patent application Ser. No. 08/344,915 to Salgado, the disclosure of which is incorporated herein by reference. The estimate would be straightforward since the job being printed would not require further "RIPing". Hence upon determining the boundary upon which the job is to be interrupted, the time associated with producing prints from unprocessed image data extending up to the next boundary could be calculated readily.

In the preferred embodiment, the copy job developer is provided with the estimate by way of, for example, a job-time display of the type taught in the Salgado application. At this stage (see step 312), the user may decide to execute a job interrupt, which decision would cause the process to branch to step 314, or obtain further information about the job in process. To understand why such further information might be useful, the following example may be considered:

The user, at 9:30 a.m., may be using a digital copier which is usually used by a "docket" department that uses the machine at a furious pace between 9 a.m. and 11:30 a.m for "urgent" jobs. At the same time, the user may not absolutely require output of his/her job until lunch time. Accordingly, with steps 318 and 320, the user can obtain readily information about how busy docket is at the moment. If docket is very busy and the developer does not wish to incur the wrath associated with interrupting one of their urgent print jobs, then the user can proceed to step 322 for the purpose of using the routing approach of the illustrated technique.

Referring to step 322, the copy job developer can choose between coming back to the copier at a later time to print the corresponding electronic master that has been developed and stored, or designate an alternative destination for receiving output of the copy job. The definition of "alternative destination" should be considered in further detail. Preferably, the alternative destination would comprise a site different than the output area at which the print job is currently being outputted. Two examples of an alternative site that readily come to mind include a mailbox bin (of the type shown in FIG. 1) or a site on the network (FIG. 2) disposed remotely of the digital copier.

At step 324 (FIG. 11), the copy job developer provides detailed information regarding the alternative site. In the case of using a mailbox bin, the user would submit a request to the controller of the type described in detail above. In the case of using a network site, an address of a remote output device would be provided. This sort of address provision is used in Hewlett-Packard network scanning/printing systems and software for addressing printing systems on a network has been disclosed by both Novell and Microsoft. The concept of accessing one of multiple printing devices from a single workstation is contemplated by U.S. Pat. No. 5,113,494 to Menendez et al., the disclosure of which is incorporated herein by reference.

Figure 11:
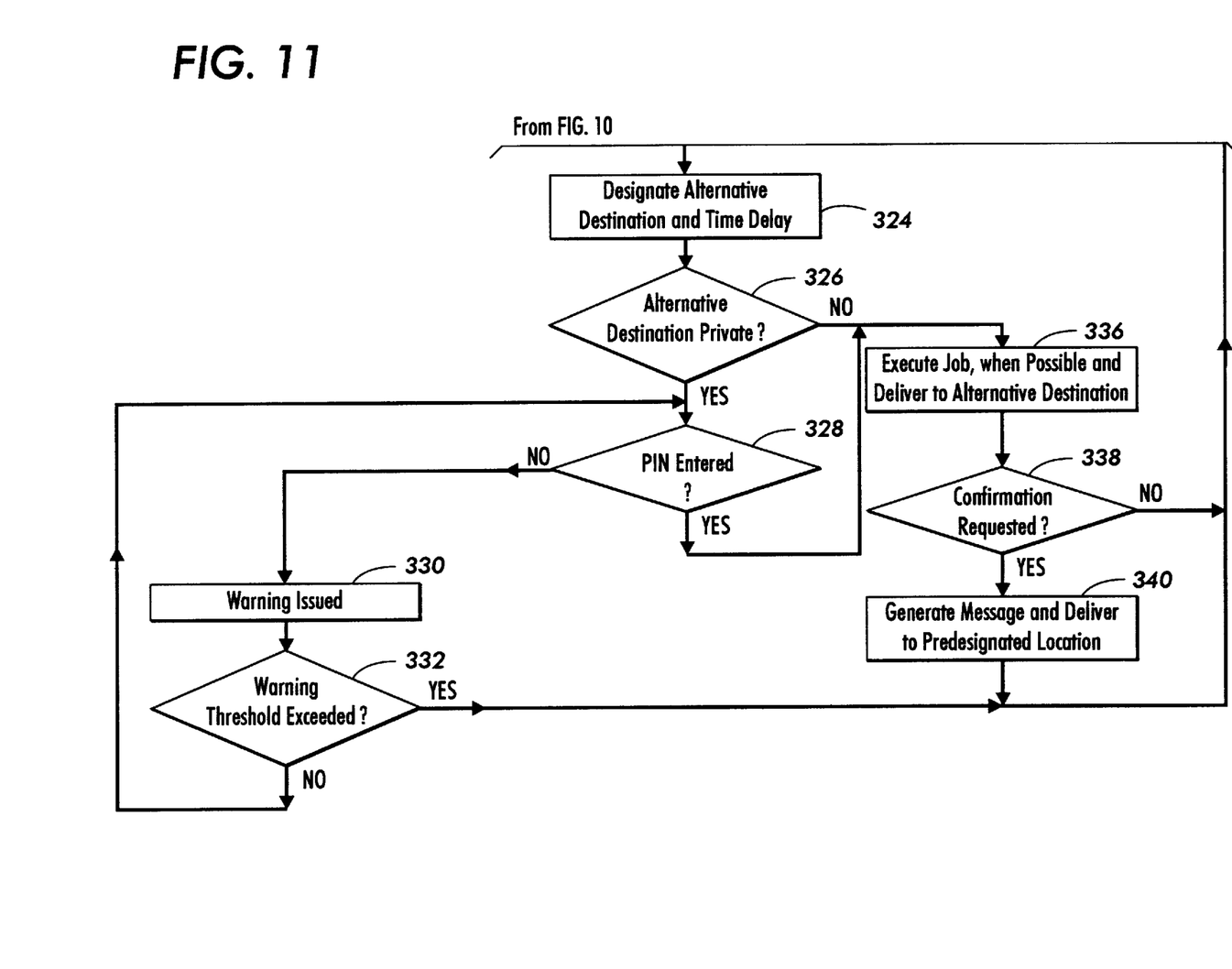

Step 324 further contemplates that a user might wish to delay printing of his/her job until a more opportune time arises. In the example above, the copy job developer may wish to add a three hour delay so that the copy job would print at 12:30 p.m.—this would allow for avoidance of the docket rush. It is believed that the provision of code permitting the user to achieve delayed printing is well within the purview of one of ordinary skill in the art of software design for electronic printing systems.

In one contemplated aspect of the illustrated technique the alternative destination comprises a private mailbox bin of the type described above. It will be appreciated that when using such private site, it is imperative that certain safeguards be established to maintain the privacy of the site. It will also be appreciated that the alternative site could be disposed on the network (FIG. 2). One example of a suitable safeguard is provided through use of steps 326 and 328. More particularly, in one example, the controller 100 (FIG. 1) checks, at step 326, to determine if the designated mailbox is private. Provided that the site is private, the illustrated technique demands a personal identification number ("PIN") from the copy job developer. In the event that a suitable PIN is not provided, the process continues to loop through steps 330 and 332 until either a suitable PIN is provided or a warning threshold has been exceeded.

Assuming that either the alternative destination site is public or a suitable PIN is entered, the job is executed (step 336), i.e. prints are produced, and delivery to the alternative destination is made. In one approach, the user is provided with a confirmation (steps 338 and 340) either automatically or in response to a request by the user. In one example, the output of the copy job is delivered to a mailbox and the user is notified of such delivery by the controller 100 in accordance with the procedure discussed above. In another example, image data is delivered to an output site and a known notification technique, provided by Novell, Inc., is employed to inform the user that the image data has been received across the network. Alternatively, a suitable protocol, such as SNMP, could be employed to send the confirmation back to the host copier. It will be appreciated that the user could also be informed when prints are produced at the remote network site.

Numerous features of the above-described embodiment will be appreciated by those skilled in the art:

First, the described embodiment(s) permits the developer of a copy job to route the copy job to an alternative destination when a print engine is busy processing a print job. This permits the copy job developer to maintain control over every aspect of job production even after s/he has scanned the job and left the host copier. Accordingly, the developer is assured that the copy job will not end up setting in some output tray for an indefinite amount of time after printing thereof.

Second, the illustrated technique permits the developer to output a representation of the copy job at a private site. In particular, the alternative destination can comprise a private site at which appropriate safeguards are taken to ensure that privacy is maintained. In one example, the private site can only be accessed by those having a suitable identifier. In this way, jobs are not delivered to the private site without the consent of the copy job developer.

Third, the illustrated technique discourages interruption of a job in process when to do so would either waste time of the copy job developer or create bad feelings among various other users of the copier. In particular, the technique is capable of informing the developer or user of estimated time to earliest interrupt, when appropriate, so that the developer/user can make a decision as to whether interrupting a job in progress will be beneficial from a time management point of view. Moreover, the user is informed about the source of the job to be interrupted so s/he can decide whether interrupting such job would be appropriate.

Finally, the illustrated technique provides a job confirmation technique which assists the user in tracking the location to which his/her job output is eventually delivered. In one example, the a representation of the copy job is delivered to an available mailbox bin and the user is informed of such location so that s/he can pick up copy job output at a convenient time. In another example, the user is informed as to where the job is being processed across a network.

What is claimed is:

1. In a printing system having a plurality of output areas and an image capture subsystem for reading a hardcopy document with image related information, the printing system further including a first memory location at which a first job, including a first set of image data, is stored and a print engine for producing a first set of prints based on the first set of image data stored at the first memory location, a method for routing a second set of image data of a second job to a second memory location for eventual output at a selected one of the plurality of output areas while the prints of the first set of prints are being produced with the first set of image data of the first memory location, comprising the steps of:

a) directing the image capture subsystem to create the second set of image data of the second job from a hardcopy document having image related information;

b) receiving, at a user interface associated with the printing system, a set of information indicating to a user of the printing system that the print engine is busy producing the first set of prints with the first set of image data of the first memory location; and c) in response to receiving the set of information, a user of the printing system directing a controller associated with the printing system to,
   (i) cause a second set of prints, representative of the second set of image data, to be produced subsequent to producing the first set of prints from the first set of image data, and
   (ii) cause the prints of the second job to be delivered to the selected one of the plurality of output areas, subsequent to said producing of the first set of prints.

2. The method of claim 1, in which the selected one of the plurality of output areas includes a private mailbox bin, further comprising prohibiting delivery of the second set of prints to the private mailbox bin unless the printing system user provides an identifier number.

3. The method of claim 1, further comprising notifying the printing system user that the second set of prints has been delivered to the selected one of the plurality of output areas.

4. The method of claim 1, further comprising providing the set of information with an estimate as to an earliest time at which production of the first job can be interrupted.

5. The method of claim 1, further comprising providing the set of information with an indication as to a source of the first job.

6. The method of claim 1, in which the selected one of the plurality of output areas comprises a first mailbox bin, further comprising causing a copy of the second set of prints to be delivered to a second mailbox bin.

7. The method of claim 1, further comprising configuring the selected one of the plurality of output areas as a mailbox bin.

8. The method of claim 7, in which the mailbox bin is a private mailbox bin, further comprising prohibiting delivery of the second set of prints to the private mailbox bin unless the printing system user provides an identifier number.

9. The method of claim 1, in which the printing system is a network printing system, further comprising disposing the image capture subsystem remotely of the selected one of the plurality of output areas on the network.

* * * * *